US009790737B2

United States Patent
Seib

(10) Patent No.: US 9,790,737 B2
(45) Date of Patent: Oct. 17, 2017

(54) ROLLER CLUTCH

(75) Inventor: Harold R. Seib, Greenfield, IN (US)

(73) Assignee: DRAPER, INC., Spiceland, IN (US)

( * ) Notice: Subject to any disclaimer, the term of this patent is extended or adjusted under 35 U.S.C. 154(b) by 1075 days.

(21) Appl. No.: 14/001,966

(22) PCT Filed: Mar. 5, 2012

(86) PCT No.: PCT/US2012/027745
§ 371 (c)(1),
(2), (4) Date: Aug. 13, 2015

(87) PCT Pub. No.: WO2012/122108
PCT Pub. Date: Sep. 13, 2012

(65) Prior Publication Data
US 2015/0337595 A1 Nov. 26, 2015

Related U.S. Application Data

(60) Provisional application No. 61/449,430, filed on Mar. 4, 2011.

(51) Int. Cl.
| | |
|---|---|
| *E06B 9/42* | (2006.01) |
| *E06B 9/50* | (2006.01) |
| *E06B 9/56* | (2006.01) |
| *E06B 9/78* | (2006.01) |
| *E06B 9/90* | (2006.01) |
| *F16D 43/02* | (2006.01) |

(52) U.S. Cl.
CPC .................. *E06B 9/42* (2013.01); *E06B 9/50* (2013.01); *E06B 9/56* (2013.01); *E06B 9/78* (2013.01); *E06B 9/90* (2013.01); *F16D 43/02* (2013.01); *E06B 2009/905* (2013.01)

(58) Field of Classification Search
CPC ..... E06B 9/42; E06B 9/56; E06B 9/68; E06B 9/78; E06B 9/80; E06B 9/90; E06B 2009/905; F16D 11/14; F16D 11/16; F16D 43/02; F16D 49/02
See application file for complete search history.

(56) References Cited

U.S. PATENT DOCUMENTS

| | | | |
|---|---|---|---|
| 5,890,529 A | 4/1999 | Haarer | |
| 6,749,000 B2 * | 6/2004 | Bohlen | E06B 9/322 160/178.1 R |
| 9,194,177 B2 * | 11/2015 | Anthony | E06B 9/262 |
| 2007/0056699 A1 | 3/2007 | Liu | |
| 2012/0160630 A1 * | 6/2012 | Cannaverde | E06B 9/32 192/71 |

FOREIGN PATENT DOCUMENTS

| | | |
|---|---|---|
| JP | 5-295974 | 11/1993 |
| JP | H05295974 | 11/1993 |
| KR | 10-0994401 | 11/2010 |

OTHER PUBLICATIONS

International Search Report and Written Opinion dated Jun. 8, 2012 in PCT/US2012/27745.

* cited by examiner

*Primary Examiner* — Richard Lorence
(74) *Attorney, Agent, or Firm* — Faegre Baker Daniels LLP

(57) ABSTRACT

A roller clutch for a window shade includes a housing, a bead chain wheel, and a roller adapter. Transmission of movement from the bead chain to the roller adapter depends upon the force applied by the bead chain to the roller clutch.

31 Claims, 20 Drawing Sheets

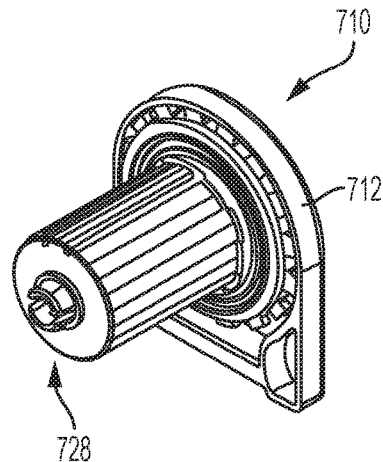
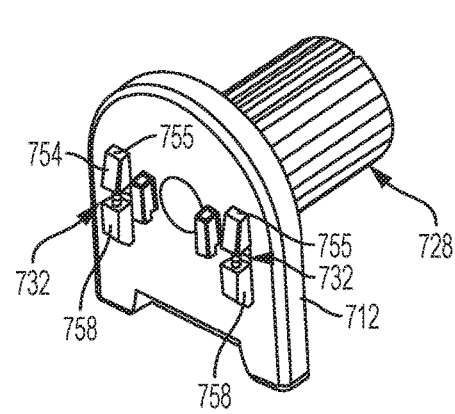
FIG. 8A    FIG. 8B
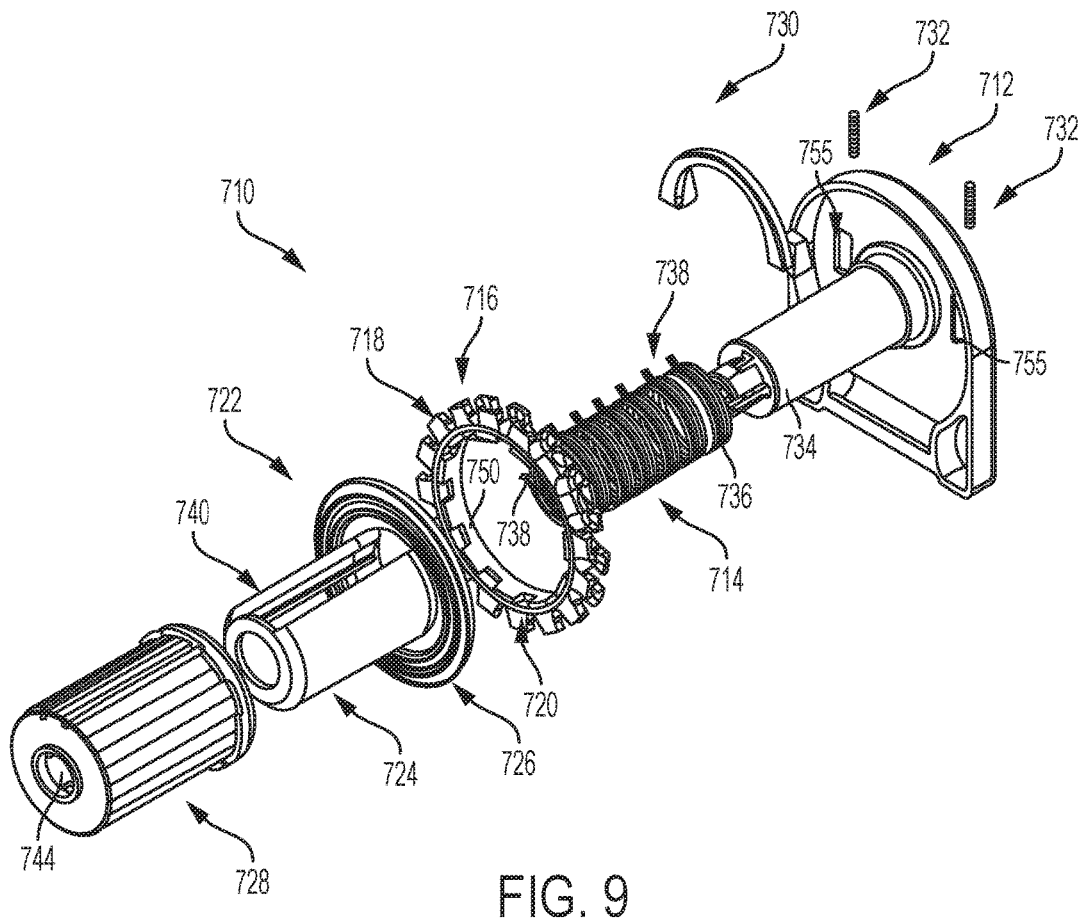
FIG. 9

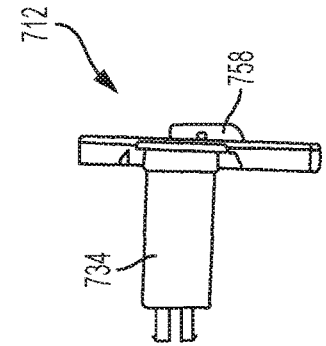
FIG. 14C
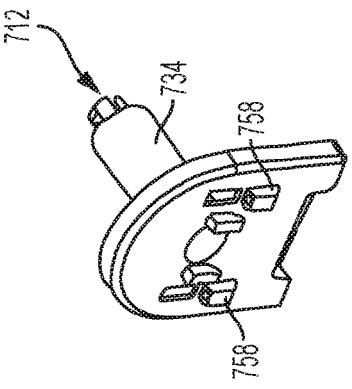
FIG. 14F
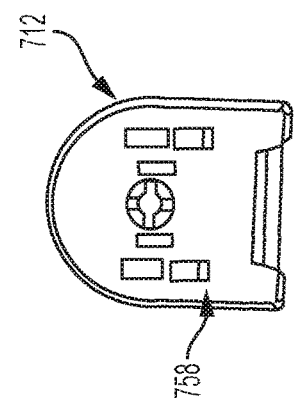
FIG. 14B
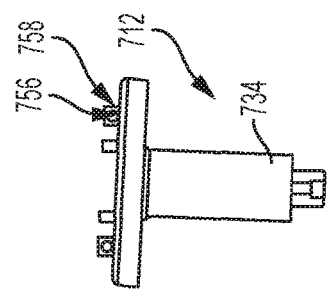
FIG. 14E
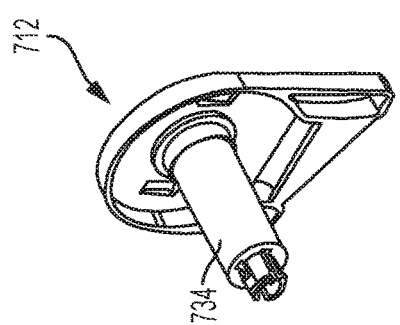
FIG. 14A
FIG. 14D

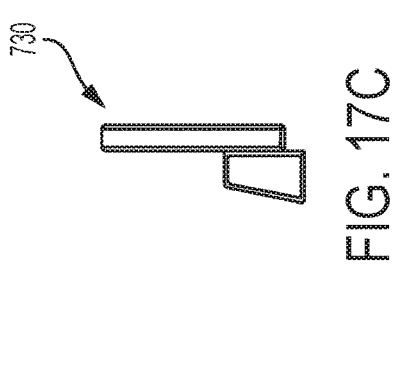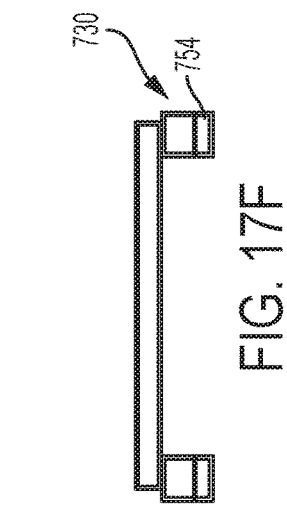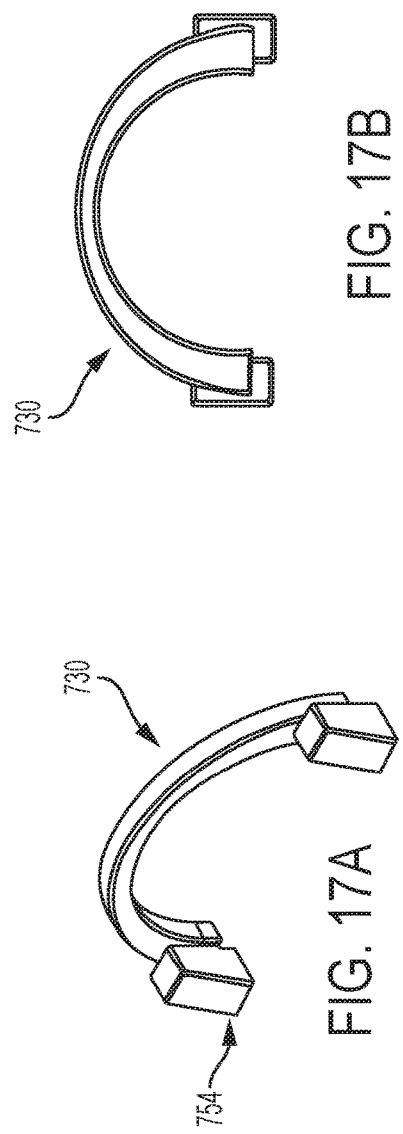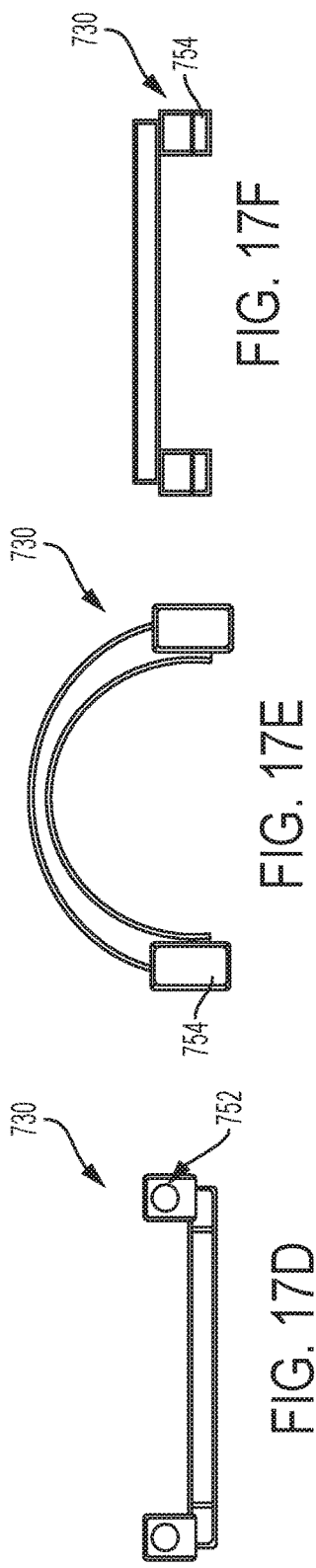

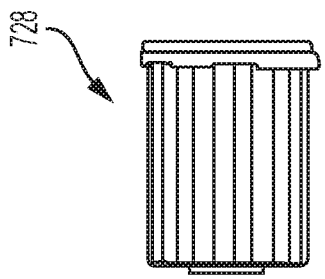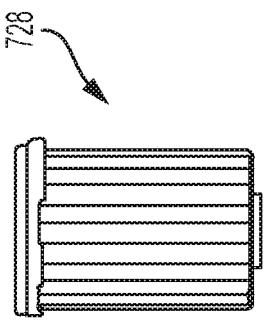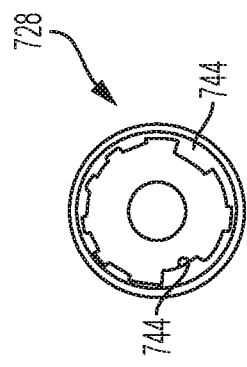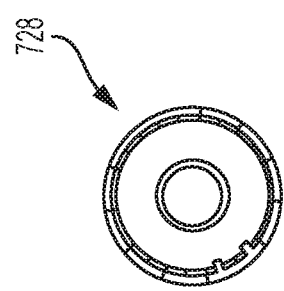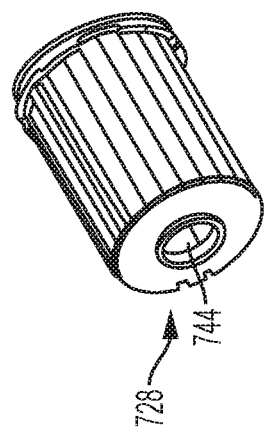

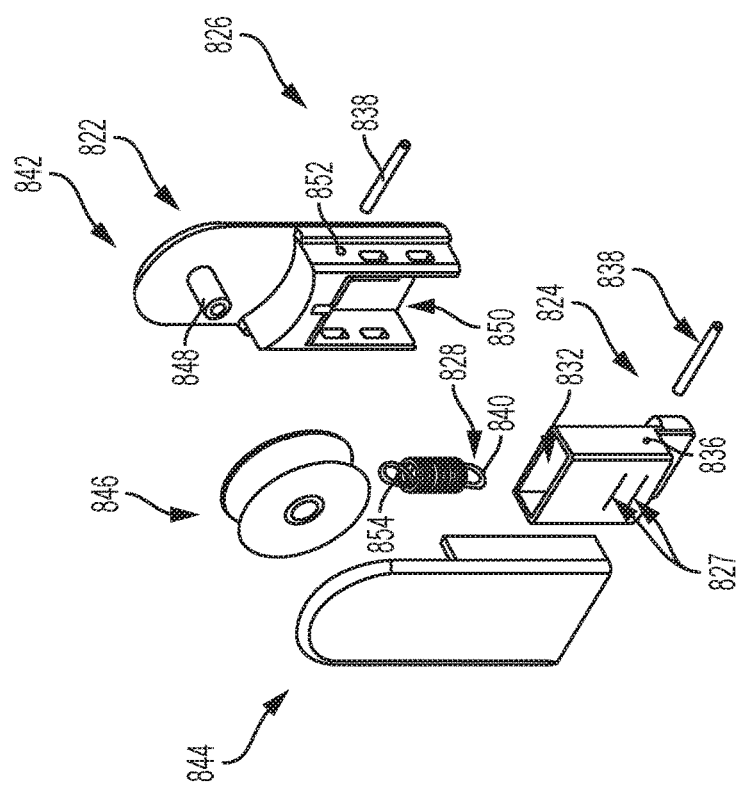
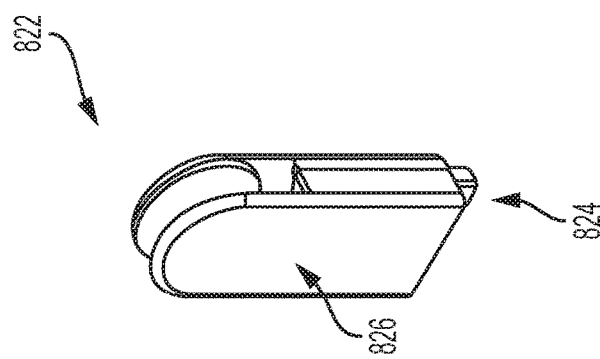

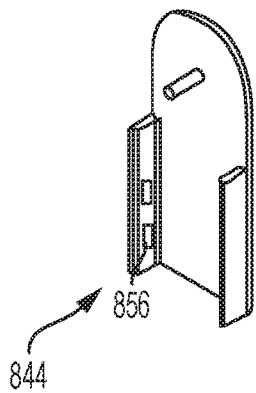
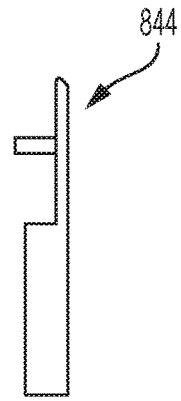
FIG. 22A  FIG. 22B
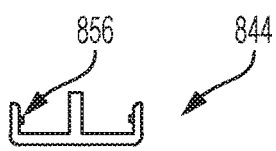
FIG. 22C
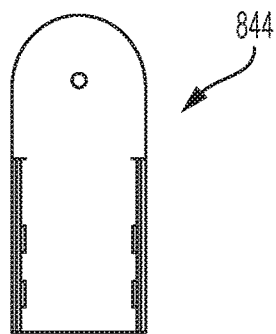
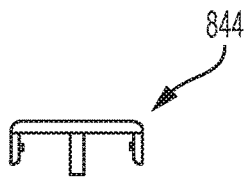
FIG. 22D  FIG. 22E

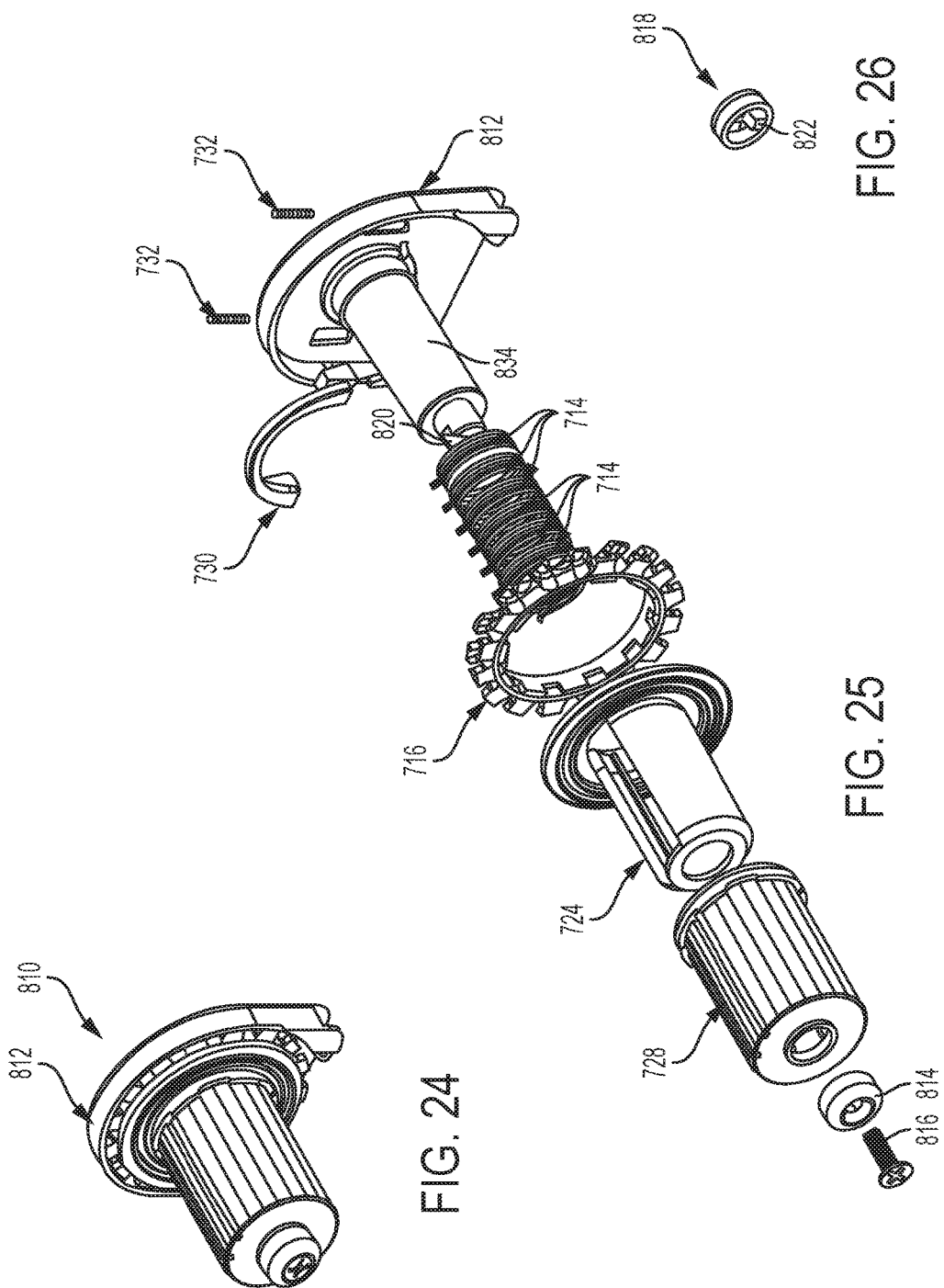

ROLLER CLUTCH

RELATED APPLICATION

The present application is a National Stage of International Application No. PCT/US2012/027745, filed Mar. 5, 2012, which claims priority to U.S. Provisional Application No. 61/449,430, filed Mar. 4, 2011, titled "ROLLER CLUTCH" to Seib, the entire disclosures of which are expressly incorporated by reference herein.

FIELD OF THE INVENTION

The present disclosure relates a window shade. More particularly, to a clutch for a window shade roller.

BACKGROUND OF THE INVENTION

Window shades are typically provided to block sun light from passing into a room through a window or other architectural opening and for privacy. Some window shades have rollers upon which fabric is wound. Roller clutches may be provided to control the winding and/or unwinding of the fabric wound on the roller of the window shade.

According to one aspect of the present disclosure, a roller clutch for a window shade including a housing, a bead chain wheel supported by the housing and configured to receive a bead chain, a roller adapter sized to be received within a window shade roller, and interactive members having a first state transmitting bead chain movement from the bead chain wheel to the roller adapter to rotate the window shade roller and a second state blocking transmission of the bead chain movement from the bead chain wheel to the roller adapter while permitting rotation of the bead chain wheel.

According to another aspect of the present disclosure, an roller clutch for a window shade is provided including a housing, a unitary bead chain wheel supported by the housing and configured to receive a bead chain, a roller adapter sized to be received within a window shade roller, and interactive members having a first state transmitting bead chain movement from the bead chain wheel to the roller adapter to rotate the window shade roller and a second state blocking transmission of the bead chain movement from the bead chain wheel to the roller adapter.

According to another aspect of the present disclosure, a roller clutch for a window shade is provided including a housing, a bead chain wheel supported by the housing and configured to receive a bead chain, a roller adapter sized to be received within a window shade roller, and a spring positioned outside of the bead chain wheel to urge the roller clutch to a disengaged position blocking transmission of movement of the bead chain to the roller adapter. Force from the bead chain moves the roller clutch to an engaged position transmitting movement of the bead chain to the roller adapter to rotate the window shade roller.

According to another aspect of the present disclosure, a roller clutch for a window shade is provided including a housing and a bead chain wheel supported by the housing and configured to receive a bead chain. The bead chain wheel is moveable relative to the housing from a raised position to a lowered position. The bead chain wheel has an upper portion and a lower portion. The lower portion of the bead chain wheel moves relative to the housing during movement of the bead chain wheel between the raised and lowered positions. The roller clutch further includes a roller adapter sized to be received within a window shade roller. Transmission of movement of the bead chain to the roller adapter is dependent upon movement of the bead chain wheel between the raised and lowered positions.

According to another aspect of the present disclosure, n roller clutch for a window shade is provided including a housing and a bead chain wheel supported by the housing and configured to receive a bead chain. The bead chain wheel has an axis of rotation moveable relative to the housing from a first position to a second position. The roller clutch further includes a roller adapter sized to be received within a window shade roller. Transmission of movement of the bead chain to the roller adapter is dependent upon movement of the axis of rotation of the bead chain wheel.

According to another aspect of the present disclosure, a roller clutch for a window shade is provided including a housing, a bead chain wheel supported by the housing and configured to receive a bead chain, a roller adapter sized to be received within a window shade roller, and interactive members having a first state transmitting bead chain movement from the bead chain wheel to the roller adapter to rotate the window shade roller and a second state blocking transmission of the bead chain movement from the bead chain wheel to the roller adapter. The size of the bead chain wheel remains consistent during movement of the interactive members between the first and second states.

BRIEF DESCRIPTION OF THE DRAWINGS

The above-mentioned and other features of the present disclosure will become more apparent and will be better understood by reference to the following description of embodiments of the present disclosure taken in conjunction with the accompanying drawings, wherein:

FIG. 8A is a perspective view of a preferred embodiment of a roller clutch;

FIG. 8B is another perspective view of a preferred embodiment of a roller clutch;

FIG. 9 is an exploded perspective view of the roller clutch of FIG. 8A showing the roller clutch, from left to right, including a roller adapter, spring driver, chain wheel, a plurality of wrap springs, a chain wheel biaser, and pair of coil springs, and a base providing a housing and spring cylinder;

FIGS. 14A-14F are views of the housing/base of the roller clutch of FIG. 8A;

FIGS. 17A-17F are views of the chain wheel biaser of FIG. 8A;

FIGS. 18A-18E are views of the roller adapter of FIG. 8A;

FIG. 19 is a perspective view of a preferred embodiment tensioner for use with roller clutches;

FIG. 20 is an exploded perspective view of the tensioner of FIG. 19 showing the tensioner, from left to right, including a cover, pulley, spring, base, a first spring pin, pulley support, and a second pin;

FIGS. 22A-22E are views of the cover of the tensioner of FIG. 19;

FIG. 24 is a perspective view of another preferred embodiment of a roller clutch;

FIG. 25 is an exploded perspective view of the roller clutch of FIG. 24 showing the roller clutch, from left to right, including a roller adapter, spring driver, chain wheel, a plurality of wrap springs, a chain wheel biaser, and pair of coil springs, and a base providing a housing and spring cylinder; and FIG. 26 is a perspective view of a cap of the roller clutch of FIG. 24.

Figure 1:
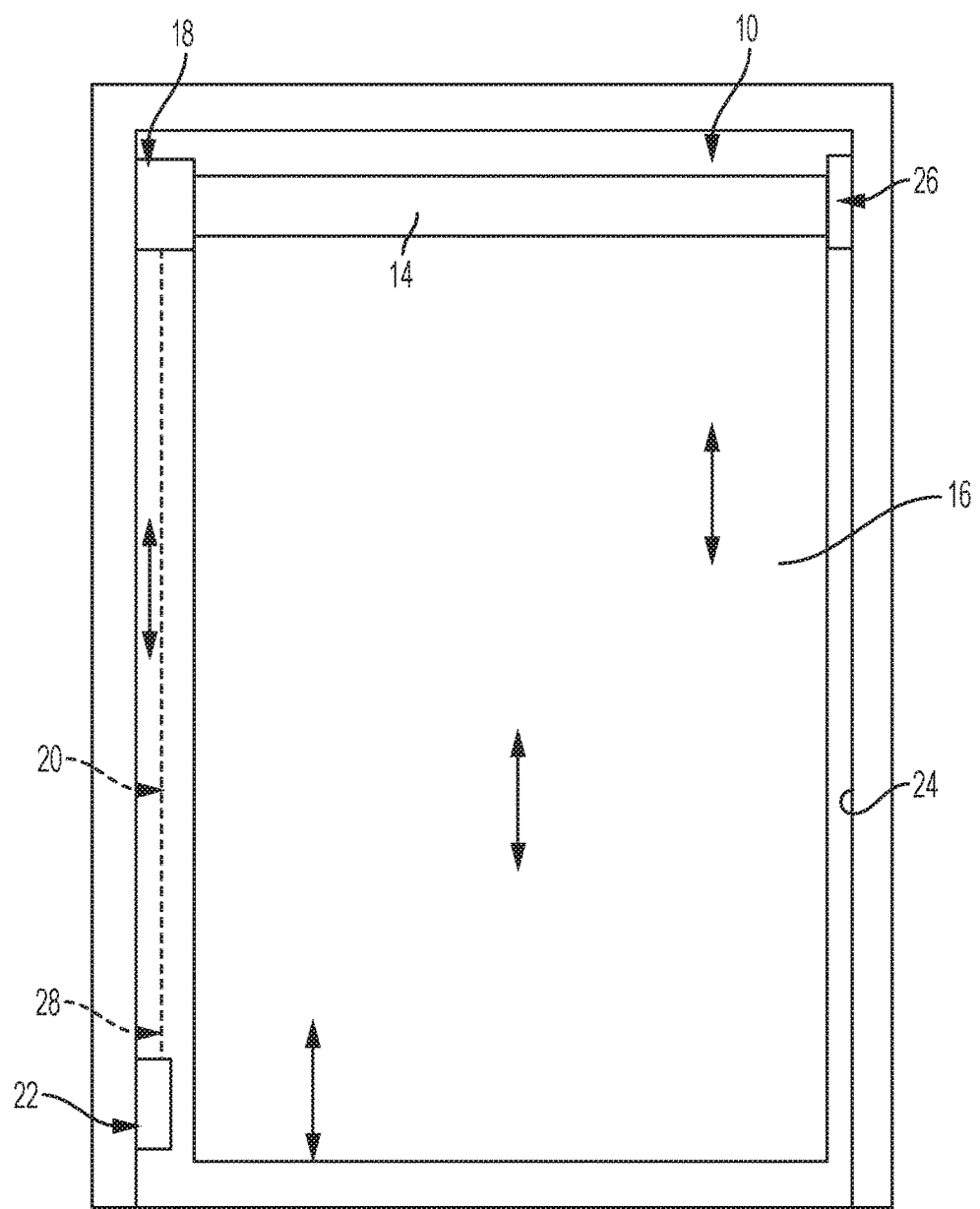
FIG. 1 is a diagrammatic view of a window shade in an architectural opening, such as a window, showing the window shade including a roller, fabric supported by the roller, a roller clutch supporting a left end of the roller, an idler supporting a right end of the roller, and a bed chain (or other flexible actuation device) used to operate the bed chain.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PREFERRED EMBODIMENTS OF THE INVENTION

The embodiments disclosed below are not intended to be exhaustive or limit the invention to the precise forms disclosed in the following detailed description. Rather, the embodiments are chosen and described so that others skilled in the art may utilize their teachings.

According to the present disclosure, a window shade 10 is provided that includes a roller tube 14, fabric 16 wrapped on roller tube 14, roller clutch 18 coupled to roller tube 14, bead chain 20 coupled to roller clutch 18, and a tensioner 22 applying tension to bead chain 20. One end of roller tube 14 is typically supported by roller clutch 18 in a window opening 24 and the other end by an idler 26 that provide rotational support of the ends of roller tube 14. Roller clutch 18 may be supported in window 24 opening by a separate bracket (not shown) or integrated with a bracket or otherwise configured to be supported in window opening 24. Window shade 10 may be positioned directly within window opening 24, adjacent to window opening 24, above window opening 24 or otherwise to block sunlight and/or air flow through window opening 24.

Normally, fabric 16 of window shade 10 is stationary in one of a fully raised position allowing more light to pass through window opening 24 into a room, a fully lowered position allowing less or none of the light to pass through window opening 24 into the room, or in an intermediate position between the fully raised and lowered positions. To change the position of fabric 16, a user pulls either side of bead chain 20 up or down to roll or unroll fabric 16 from roller tube 14.

Bead chain 20 is the preferred embodiment of a continuous loop actuator that extends between tensioner 22 and roller clutch 18. According to alternative embodiments, the actuator may be unbeaded, such as a cord, non-continuous, such as having one or more terminal ends, or other suitable actuator configurations known to those of ordinary skill in the art.

According to the preferred embodiment of the present disclosure, force and/or energy transmitted through bead chain 20 will not raise or lower fabric 16 unless a lower end 28 of bead chain 20 is fixed to window opening 24 or another structure. If lower end 28 of bead chain 20 is properly fixed, roller clutch 18 transmits the force and/or energy to roller tube 14 to raise or lower fabric 16.

According to the preferred embodiment of the present disclosure, roller clutch 18 is configured to detect when tension is applied to bead chain 20 providing an indication that lower end 28 of bead chain 20 is properly fixed. Tensioner 22 couples bead chain 20 to window opening 24 or other building structure. After installation, tensioner 22 applies a downward force on bead chain 20, which applies tension to bead chain 20. Preferably, roller clutch 18 detects this tension and allows the force and/or energy applied by a user to bead chain 20 to rotate roller tube 14 to raise or lower fabric 16.

Figure 2:
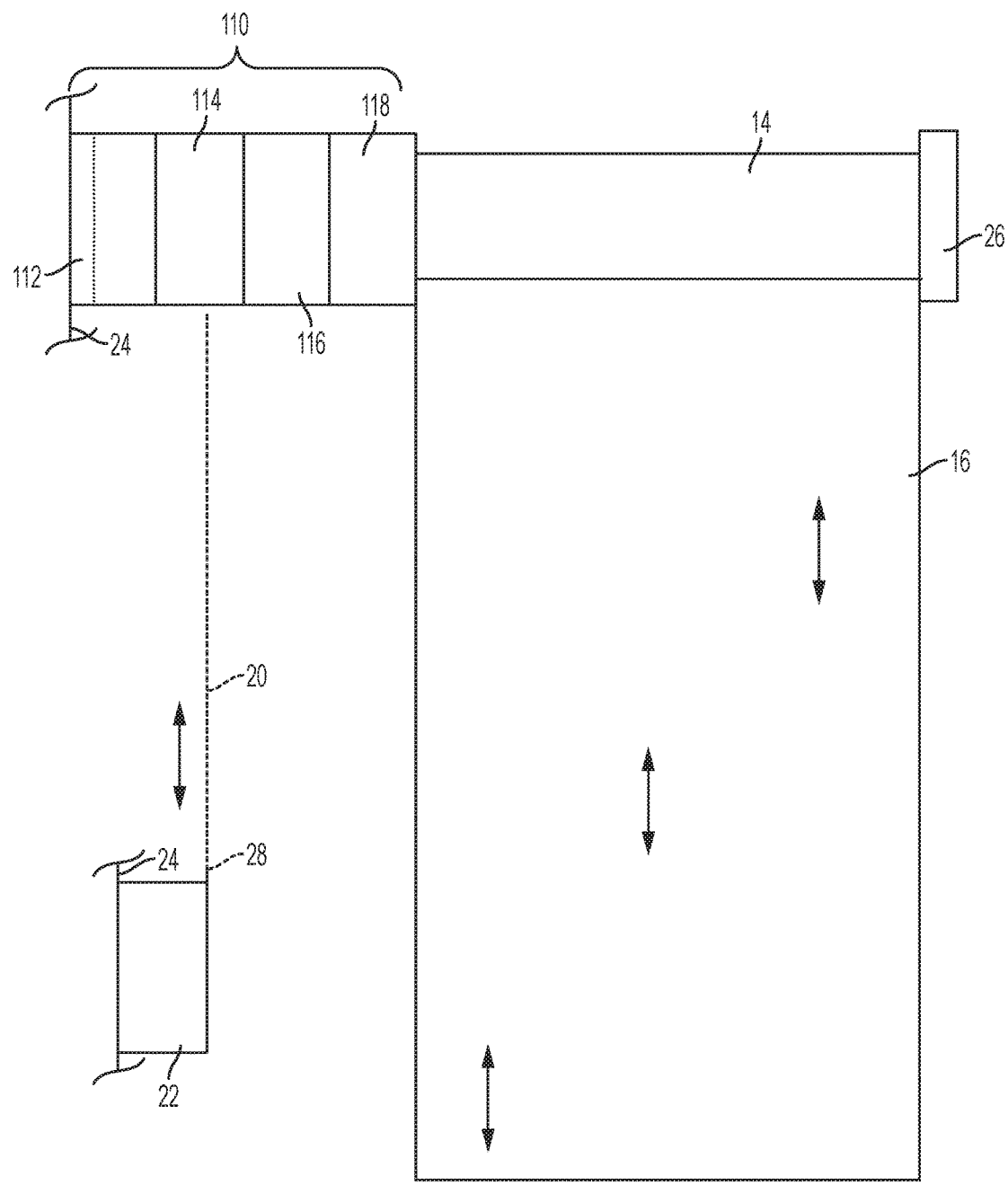
FIG. 2 is a view showing an example roller clutch having a support end or bracket mounted on a portion of the building, such as a window jamb, a first engagement portion coupled to the bead chain, a second engagement portion, and a roller support end supporting the roller and showing the first and second engagement portions positioned relative to each other to transmit force provided by the bed chain to the roller to raise or lower the fabric supported by the roller.

Referring to FIG. 2, an example window shade mount/roller clutch 110 is shown having a support end or bracket 112 mounted on a portion of window opening 24, a first engagement portion 114 coupled to bead chain 20, a second engagement portion 116, and a roller support end 118 supporting roller 14. Portions of roller clutch 110 may positioned within roller 14 and portions may be positioned outside of roller 14.

First and second engagement portions 114, 116 are positioned relative to each other to transmit force provided by bed chain 20 to roller 14 to raise or lower fabric 16 supported by roller 14. When lower end 28 of bead chain 20 is coupled to wall opening 24, as shown in FIG. 2, first engagement portion 114 engages or otherwise enables the transfer of force and/or energy from bead chain 20 to second engagement portion 116. If lower end 28 of bead chain 20 is not coupled to wall opening 24 or another portion of a building structure, first engagement portion 114 blocks the transfer of force and/or energy to second engagement portion 116 by disengaging from second engagement portion 116 or otherwise preventing the force and/or energy from bead chain 20 to roller 14.

Figure 3A:
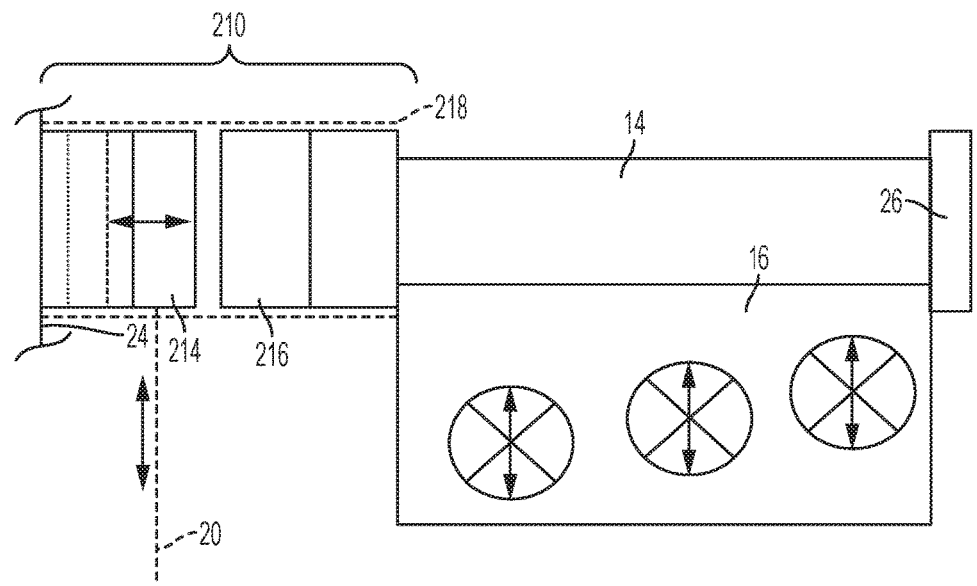
FIG. 3A is a view similar to FIG. 2, showing a roller clutch having a first engagement portion spaced apart from the second engagement portion so that force transmitted by the bed chain is not transmitted to second engagement portion so the force provided by the bed chain does not raise or lower the fabric supported by the roller.

Referring to FIG. 3A, a roller clutch 210 is shown having first engagement portion 214 spaced apart from second engagement portion 216 so that force transmitted by bed chain 20 is not transmitted to second engagement portion 216 so the force and/or energy provided by bead chain 20 does not raise or lower fabric 16 supported by roller 14. A housing 218 (shown in phantom), supports second engagement portion 216 relative to first engagement portion 214. First engagement portion 216 is spaced apart from second engagement portion 216 because lower end 28 of bead chain 20 is not secured to window opening 24. Because first and second engagement portions 214, 216 are spaced apart, force and/or energy transferred to first engagement portion 214 is not transferred to second engagement portion 216 and roller 14 is not raised or lowered.

Figure 3B:
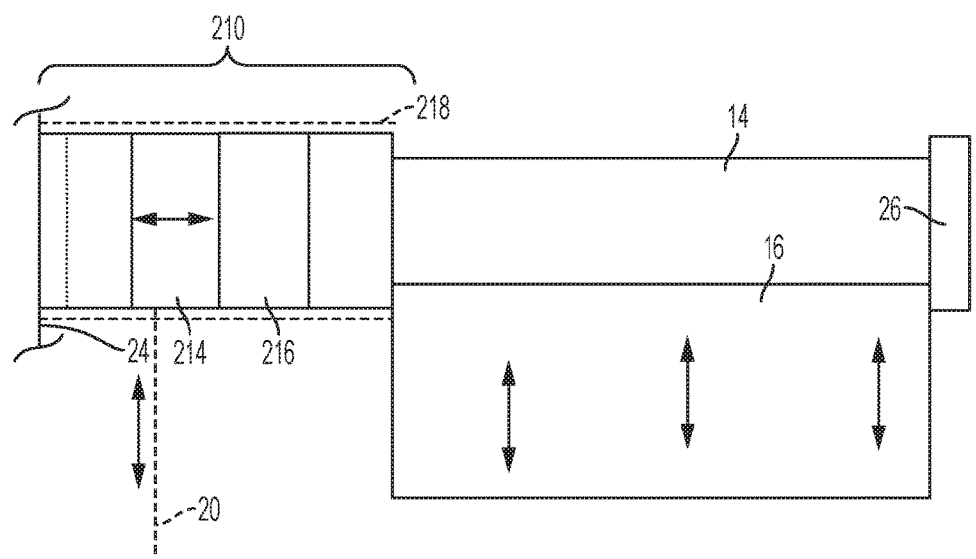
FIG. 3B is a view similar to FIG. 3A showing the first engagement portion moved into engagement with the second engagement portion, preferably by tension provided in the bed chain, to transmit force from the bead chain to the roller to raise or lower the fabric.

When lower end 28 of bead chain 20 is fastened to window opening 24 or otherwise, first engagement portion 214 moves into engagement with second engagement portion 216 as shown in FIG. 3B. When sufficiently engaged with each other, first engagement portion 214 will rotate second engagement portion 216, causing roller 14 to rotate to raise or lower fabric 16. This engagement allows force/energy transmitted to first engagement portion 214 from bead chain 20 to be transmitted to second engagement portion 216. Preferably, the direction of rotation of first engagement portion 214 depends on which side of bead chain 20 the user pulls.

The movement of first engagement portion 214 is shown as horizontal in FIG. 3A, but it could be in other directions, such as vertical. Furthermore, first engagement portion 214 is shown moving in FIG. 3A to provide the engagement and disengagement. According to alternative embodiments, the movement may occur in other components, such as second engagement portion 216 or otherwise.

Although shown as completely separated in FIG. 3A, first and second engagement portions 214, 216 may be in contact or partial engagement and still not transmit sufficient force and/or energy from bead chain 20 to roller 14. For example, when bead chain 20 is properly secured, first and second engagement portions 214, 216 may be engaged with a first amount of force between them that is sufficient to transmit force/energy from bead chain 20. When bead chain 20 is not properly secured, first and second engagement portions 214, 216 may be engaged by a second amount of force. The second amount of force may allow slippage between first and second engagement portions 214, 216 so that roller 14 does not raise or lower fabric 16.

Figure 4A:
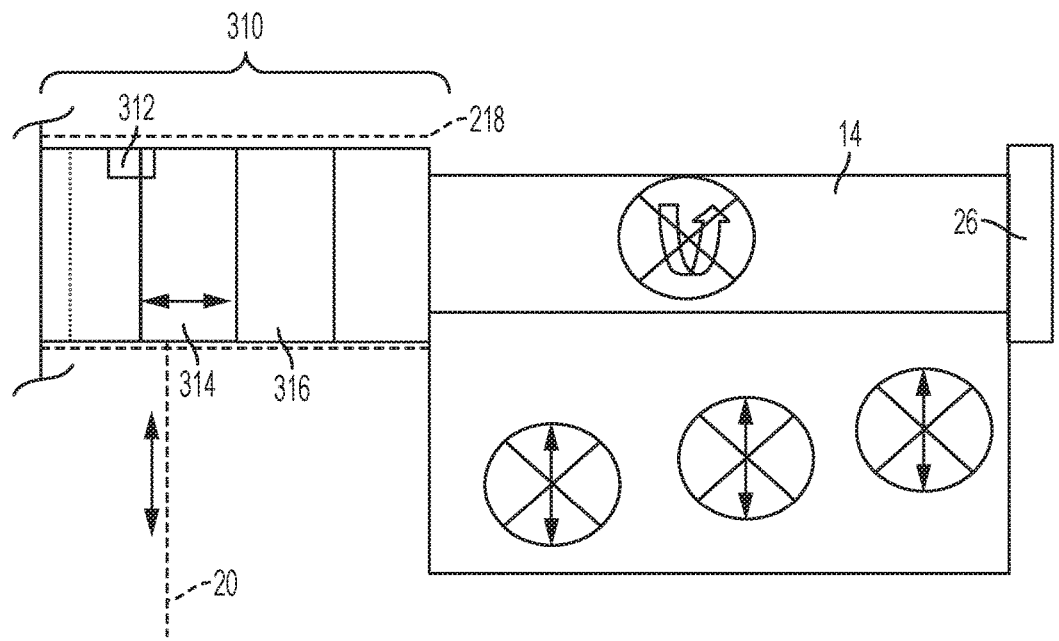
FIG. 4A is a view similar to FIG. 2 showing the roller clutch including a blocking member that blocks transmission of the force provided by the bed chain from being transmitted to the roller to block raising or lowering of the fabric.

Referring to FIG. 4A, a roller clutch 310 is shown having first engagement portion 314 engaged with blocking member 312 and in contact with second engagement portion 316. Blocking member 312 prevents rotation of first engagement portion 314 that receives force and/or energy from bead chain 20. Because blocking member 312 prevents such rotation, force/or energy transmitted by bed chain 20 is not transmitted to second engagement portion 316 so the force and/or energy provided by bead chain 20 does not raise or lower fabric 16 supported by roller 14. First engagement portion 314 is engaged with blocking member 312 because the lower end of bead chain 20 is not secured to window opening 24.

Figure 4B:
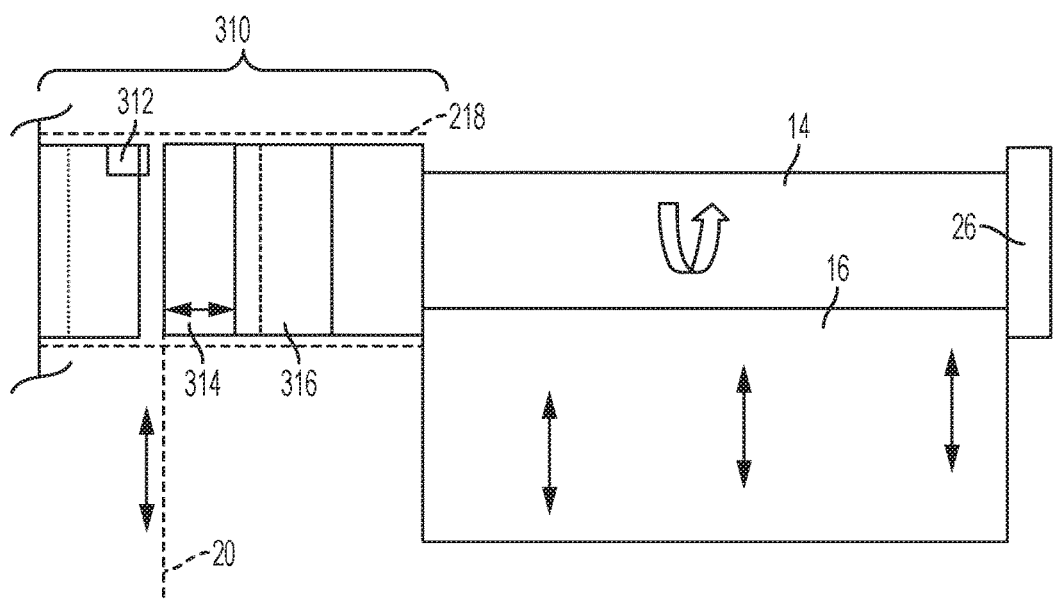
FIG. 4B is a view similar to FIG. 4A showing the first engagement member moved away from the blocking member to permit transmission of the force provided by the bead chain to the roller to raise or lower the fabric.

When bead chain 20 is fastened to window opening 24 or otherwise, first engagement portion 314 moves out of engagement with blocking member 312 as shown in FIG. 4B. This disengagement allows force/energy transmitted to first engagement portion 314 from bead chain 20 to be transmitted to second engagement portion 316 because first engagement portion 314 can rotate or otherwise move. When sufficiently disengaged from blocking member 312, first engagement portion 314 will rotate second engagement portion 316, causing roller 14 to rotate to raise or lower fabric 16.

The movement of first engagement portion 314 is shown as horizontal in FIG. 4A, but it could be in other directions, such as vertical. Furthermore, first engagement portion 314 is shown moving in FIG. 4A to provide the engagement and disengagement. According to alternative embodiments, the movement may occur in other components, such as in blocking member 312, second engagement portion 316, or otherwise. First and second engagement portions 314, 316 may be splined together or otherwise coupled together to permit translation therebetween as shown in FIGS. 4A and 4B while coupling them together for rotation.

Although shown as completely separated from blocking member 312 in FIG. 4A, first second engagement portion 314 may be in contact or partial engagement with blocking member 312 and still transmit sufficient force and/or energy from bead chain 20 to roller 14. For example, when bead chain 20 is properly secured, first engagement portion 314 and blocking member 312 may be engaged with a first amount of force between them. When bead chain 20 is not properly secured, first engagement portion 314 and blocking member 312 may be engaged by a second amount of force. The first amount of force may allow slippage between first engagement portion 314 and blocking member 312 so that roller 14 raises or lowers fabric 16.

Figure 5A:
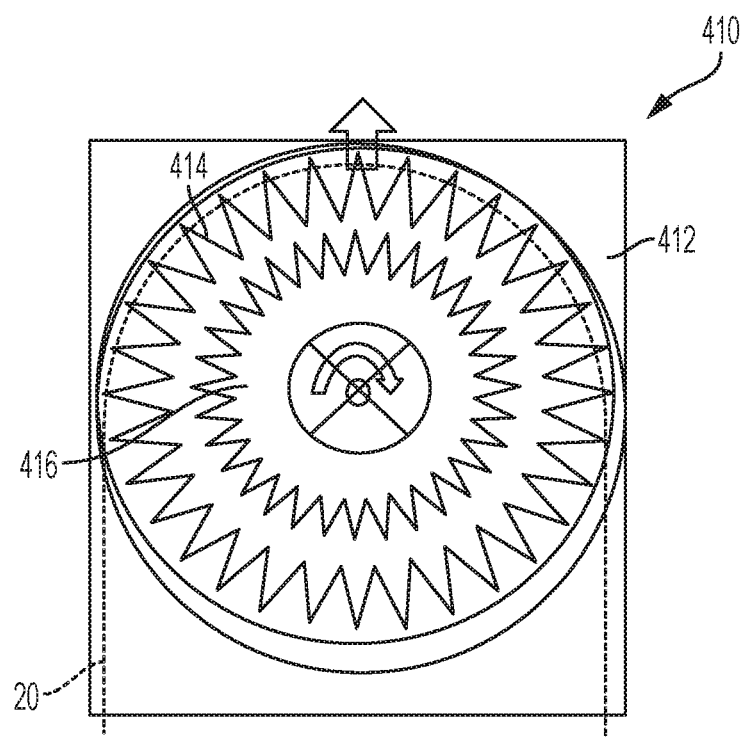
FIG. 5A is a diagrammatic cross-sectional view of a roller clutch having an outer gear and an inner gear spaced apart from the inner gear so that force transmitted by the bead chain coupled to the outer gear is not transmitted to the inner gear, which is coupled to a roller.
Figure 5B:
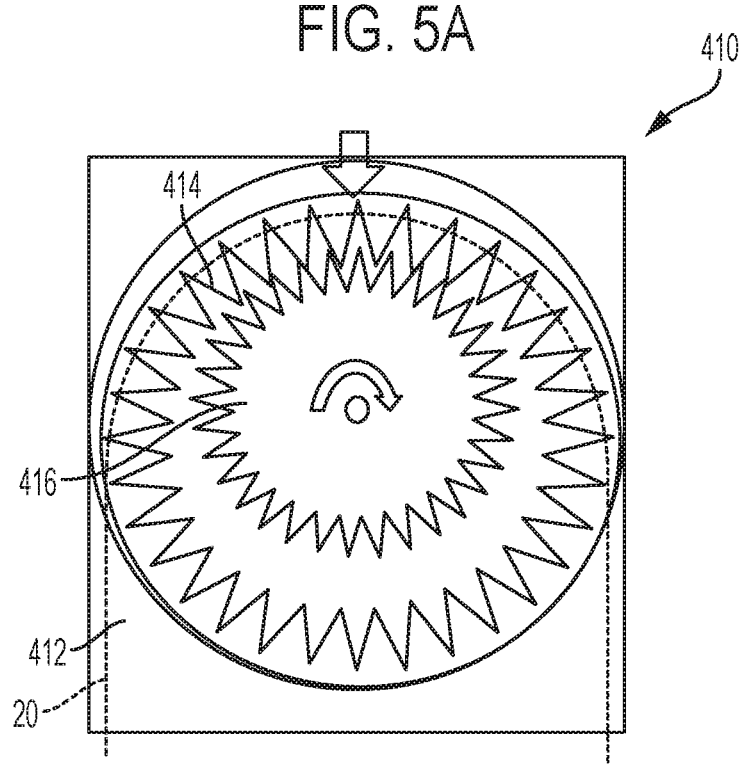
FIG. 5B is a view similar to FIG. 5A showing the outer gear moved into engagement with the inner gear by tension on the bead chain so that rotational force of the outer gear from the bed chain is transmitted to the inner gear to rotate the roller and raise or lower the fabric.

FIGS. 5A and 5B illustrate a roller clutch 410 having a housing 412, a first engagement portion 414 shaped as a first gear and a second engagement portion 416 shaped as a second gear positioned radially inwardly of the first gear 414. First gear 414 supports bead chain 20 and receives force and/or energy from bead chain 20. As shown in FIG. 5A, first gear 414 is spaced apart from second gear 416 so that the teeth of gears 414, 416 to not engage by meshing. A device, such as a spring (not shown) biases first gear 414 to the position shown in FIG. 5A when bead chain 20 is not coupled to window opening 24 or other structure with sufficient tension to overcome the bias of the spring. When bead chain 20 is coupled to window opening 24 and tensioned with sufficient force, bead chain 20 pulls first gear 414 downward toward second gear 416 against the bias of the spring as shown in FIG. 5B. This movement engages the teeth of gears 414, 416 by meshing.

When in the position shown in FIG. 5A, bead chain 20 can rotate first gear 414. Because the teeth of first and second gears 414, 416 are not engaged, the rotation of the first gear is not transmitted to the second gear 416. Thus, even though first gear 414 rotates, second gear 416 does not. Preferably, second gear 416 is operatively coupled to roller 14 so that rotation of second gear 416 rotates roller 14 to raise or lower fabric 16 as shown in FIG. 5B. Thus, when bead chain 20 is properly coupled to window opening 24, bead chain 20 will rotate first and second gears 414, 416 and roller 14 in either direction depending on which side of bead chain 20 the user pulls.

Figure 6A:
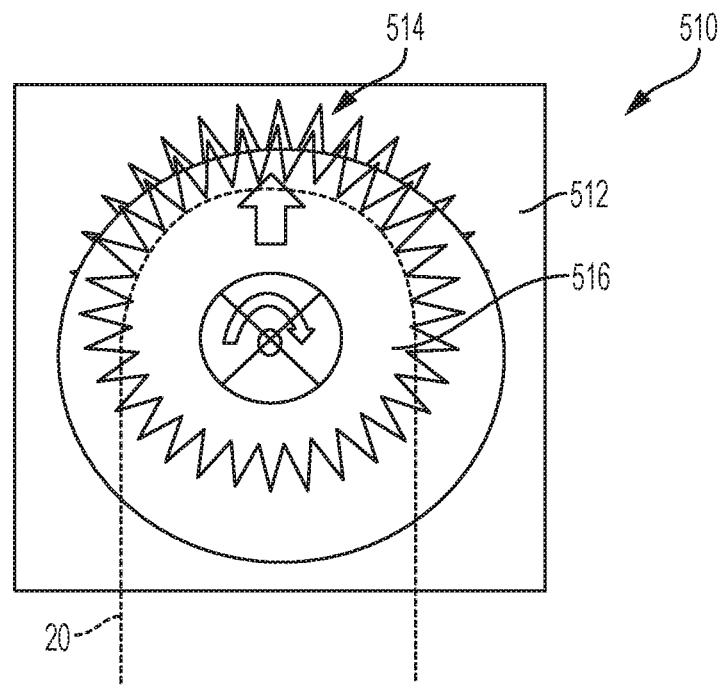
FIG. 6A is a diagrammatic cross-sectional view of a roller clutch having an outer gear portion and an inner gear in engagement with the outer gear portion so that the outer gear portion blocks rotation of the inner gear so that force transmitted by the bead chain coupled to the inner gear is not transmitted to the roller, which is coupled to the inner gear.
Figure 6B:
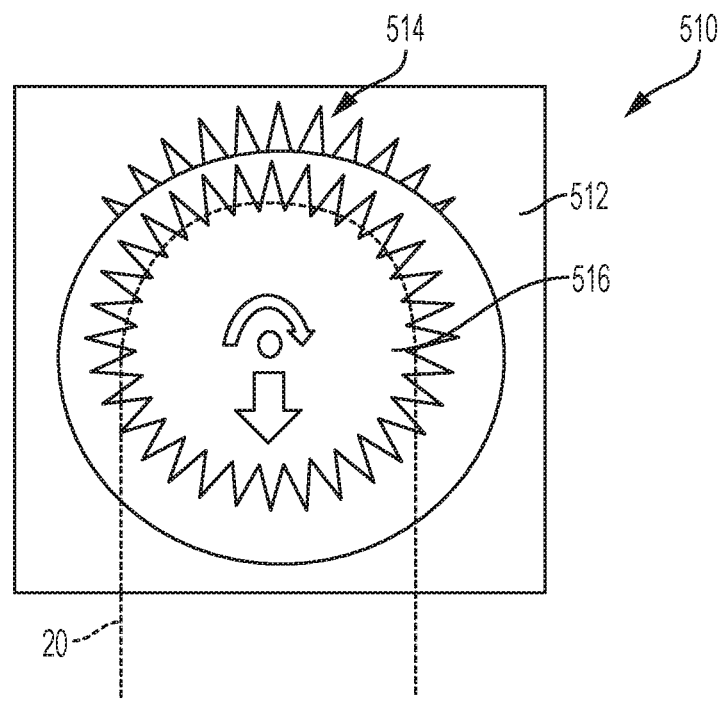
FIG. 6B is a view similar to FIG. 6A showing the inner gear moved away from engagement with the outer gear portion by tension on the bead chain so that rotational force of the inner gear from the bed chain is transmitted to the roller to rotate the roller and raise or lower the fabric.

FIGS. 6A and 6B illustrate a roller clutch 510 having a housing 512, a first engagement portion 514 shaped as gear teeth in housing 512 and a second engagement portion 516 shaped as a gear positioned below gear teeth 514. Gear 516 supports bead chain 20 and receives force and/or energy from bead chain 20. As shown in FIG. 6A, gear 414 is engaged with gear teeth 514 of housing 512 to block rotation of gear 516. A device, such as a spring (not shown) biases gear 516 to the position shown in FIG. 6A when bead chain 20 is not coupled to window opening 24 or other structure with sufficient tension to overcome the bias of the spring. When in the position shown in FIG. 6A, bead chain 20 cannot rotate gear 516. Because teeth 514 and the teeth of gear 516 are engaged, the force and/or energy of bead chain 20 is not transmitted to roller 14. When bead chain 20 is coupled to window opening 24 and tensioned with sufficient force, bead chain 20 pulls gear 516 downward against the bias of the spring as shown in FIG. 6B. This movement disengages teeth of gear 516 from teeth 514 to allow rotation of gear 516.

Preferably, gear 516 is operatively coupled to roller 14 so that rotation of gear 516 rotates roller 14 to raise or lower fabric 16 as shown in FIG. 6B. Thus, when bead chain 20 is properly coupled to window opening 24, bead chain 20 will rotate gear 516 and roller 14 in either direction depending on which side of bead chain 20 the user pulls.

Figure 7A:
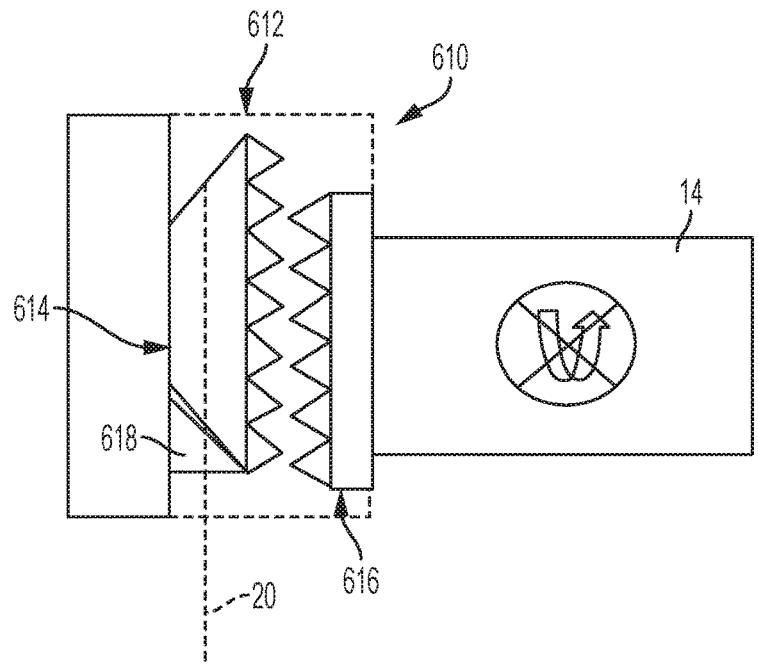
FIG. 7A is a diagrammatic side elevation view of a roller clutch having a first gear coupled to a bead chain and a second gear coupled to a roller and spaced apart from the first gear so that the force transmitted to the first gear by the bead chain is not transmitted to the second gear.
Figure 7B:
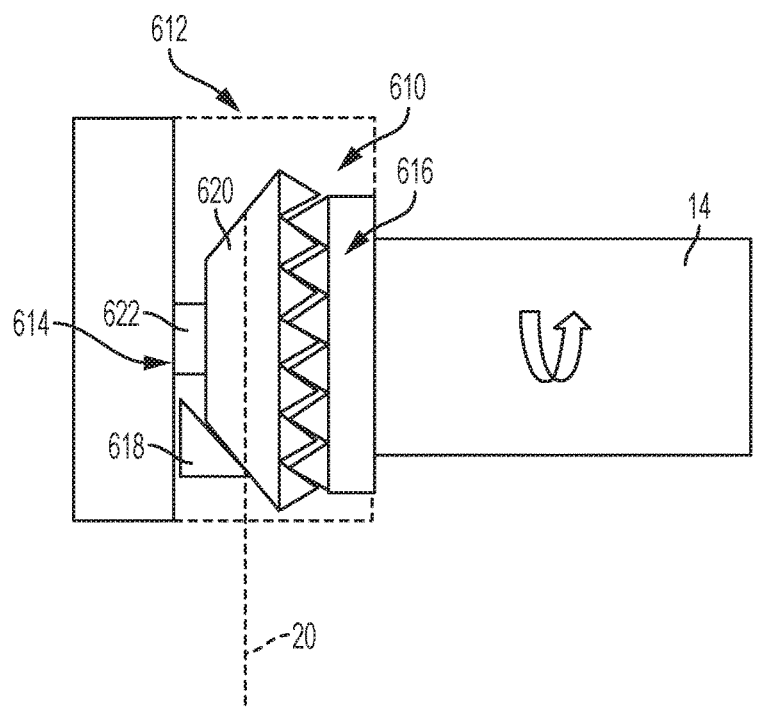
FIG. 7B is a view similar to FIG. 7A showing the first gear moved into engagement with a ramp, which moves the first gear into engagement with the second gear to transmit force from the bead chain to the second gear to rotate the roller and raise or lower fabric attached to the roller.

FIGS. 7A and 7B illustrate a roller clutch 610 having a base or housing 612 (portions shown in phantom), a first engagement portion or bead chain wheel 614 having teeth or lugs and a second engagement portion 616 having teeth or lugs positioned between roller 14 and first engagement portion 614. First engagement portion 614 supports bead chain 20 and receives force and/or energy from bead chain 20. As shown in FIG. 7A, first engagement portion 614 is spaced apart from second engagement portion 616 so that the teeth or lugs do not mesh to prevent rotation of first engagement portion 514 by bead chain 20 from rotating second engagement portion 616 and roller 14. First engagement portion 616 rotates on a shaft 622 that rides up and down housing 612. A device, such as a spring (not shown), biases first engagement portion 614 to the position shown in FIG. 7A when bead chain 20 is not coupled to window opening 24 or other structure with sufficient tension to overcome the bias of the spring. When bead chain 20 is coupled to window opening 24 and tensioned with sufficient force, bead chain 20 pulls first engagement portion 616 downward against the bias of the spring as shown in FIG. 7B. Housing 612 includes a ramp 618 and first engagement portion 614 includes a corresponding annular ramp 620. As bead chain 20 pulls first engagement portion 616 down, ramp 618 urges first engagement portion 614 to the right as shown in FIG. 7B. This movement engages the teeth of first engagement portion 614 with the teeth of the second engagement portion 616 to allow rotation of second engagement portion 616. Also during this movement, the axis of rotation of first engagement portion 614 moves axially relative to its axis of rotation.

When in the position shown in FIG. 7A, bead chain 20 cannot rotate second engagement portion 616. Because first and second engagement portions 614, 616 are disengaged, the force and/or energy of bead chain 20 is not transmitted to roller 14. Preferably, second engagement portion 616 is operatively coupled to roller 14 so that rotation of second engagement portion 616 rotates roller 14 to raise or lower fabric 16 as shown in FIG. 7B. Thus, when bead chain 20 is properly coupled to window opening 24, bead chain 20 will rotate second engagement portion 616 and roller 14 in either direction depending on which side of bead chain 20 the user pulls.

According to one alternative embodiment, the teeth and lugs of engagement portions 614, 616 are replaced with friction plates that engage and disengaged as described above. When bead chain 20 is tensioned, eventually enough force exists between first and second engagement portions 614, 616 to transmit sufficient force and/or energy to second engagement portion 616 to rotate roller 14.

According to another alternative embodiment, housing 612 includes one or more blocking members (not shown) similar to the teeth of first engagement portion 614. These blocking members are positioned between first engagement portion 614 and the left portion of housing 612. The teeth of first engagement portion 614 are moved to the opposite side of first engagement portion 614 from that shown in FIGS. 7A and 7B to engage or mesh with the blocking member(s) of housing 612. First and second engagement members 612, 614 are coupled together to permit translation therebetween and remain coupled together against relative rotation. If bead chain 20 is not coupled to window opening 24, the blocking members of housing 612 engage the corresponding teeth of first engagement portion 614 to block rotation thereof. If bead chain 20 is coupled to window opening 24 and pulls first engagement portion 614 down (as shown illustratively in FIG. 7B), the blocking members of housing 612 disengages from the teeth of first engagement portion 614 to allow rotation of first engagement portion 614, second engagement portion 616, and roller 14.

A preferred embodiment roller clutch 710 is shown in FIGS. 8A-17F. Roller clutch 710 includes a housing 712, a plurality of wrap springs 714, a first engagement portion 716 formed as ring 716 providing a combination bead chain wheel 718 and first gear 720, a second engagement portion 722 formed as clutch spring driver 724 and second gear 726, a roller or drive adapter 728, a gear separator 730, and a pair of springs 732. Typically, roller clutch 710 is supported on a metal bracket (not shown) which is mounted in window opening 24. Additional details of a suitable bracket are provided in U.S. Pat. No. 6,935,401, to Fraczek et al., the entire disclosure of which is expressly incorporated by reference herein. According to an alternative embodiment, the metal bracket is permanently attached to the housing to reduce the overall length of the roller clutch and bracket combination and reduce the number of parts an installer must handle. Roller 14 is inserted over drive adapter 728 to rotate roller 14.

Bead chain wheel 718 is preferably unitary. For example, an upper portion is integral with a lower portion. During movement of chain wheel 718 as discussed below, the portions of bead chain wheel 718 move in unison.

When assembled, springs 714 are positioned over a cylinder 734 of housing 712. Springs 714 include coils 736 and a plurality of tangs 738. Before assembly, coils 736 have an inner diameter that is slightly smaller than the outer diameter of cylinder 734. To assemble springs 714 on cylinder 734, springs 714 are expanded so they will fit over cylinder 734. When released from this expanded, assembly condition, coils 736 grip the exterior of cylinder 734 to create friction therebetween. This friction resists rotation of springs 714 on cylinder 734. As described below in greater detail, springs 714 interact with drive adapter 728 to either rotate roller 14 or block rotation of roller 14. When springs 714 sufficiently grip cylinder 734, the interaction between drive adapter 728 and springs 714 blocks rotation of roller 14.

During normal operation, bead chain 20 extends over chain wheel 718, which transmits rotational force or torque to clutch spring driver 724 when a user pulls on either side of bead chain 20 and bead chain 20 is properly installed. Clutch spring driver 724 includes a pair of windows 740 at least partially defined by a pair of drive surfaces 742. Tangs 738 of springs 714 extend into windows 740. When bead chain 20 and chain wheel 718 rotate clutch spring driver 724, one of drive surfaces 742 contact tangs 738 to slightly expand coils 736. This expansion reduces the grip of coils 736 on cylinder 734 and the friction therebetween to allow springs 714 to rotate on cylinder 734. As discussed above, drive adapter 728 will rotate with springs 714 to rotate roller 14 and raise or lower fabric 16.

The weight of fabric 16 on roller 14 creates rotational force or torque. As shown in FIGS. 18A-18E, drive adapter 728 includes a pair of inwardly extending lugs 744. Unless a user is pulling on bead chain 20, one of lugs 744 presses on one set of respective tangs 738 of springs 714. This force encourages springs 714 to retract further toward cylinder 734, which increases the grip between springs 714 and cylinder 734 to further block rotation of springs 714 on cylinder 734. Additional details of suitable clutch spring operation are provided in U.S. Pat. No. 4,372,432, to Waine et al and U.S. Pat. No. 5,375,643; to Rude, the entire disclosures of which are expressly incorporated by reference herein.

As discussed above, in normal operation when lower end 28 of bead chain 20 is coupled to window opening 24, bead chain 20 operates clutch 710 to raise and lower fabric 16 on roller 14. However, if lower end 28 of bead chain 20 is not coupled to a window opening 24 or otherwise adequately secured, bead chain 20 will not operate clutch 710 to raise or lower fabric 16.

As discussed above, force and/or energy are transmitted from bead chain 20 through the combination chain wheel 718 and first gear 720, the combination second gear 726 and clutch spring driver 724, and drive adapter 728 to roller 14. Because respective tangs 738 of springs 714 are sandwiched between clutch spring driver 724 and drive adapter 728, they also transmit this force and/or energy. The transmission of force and/or energy between first gear 720 and second 726 is dependent on whether lower end 28 of bead chain 20 is adequately secured or not. If bead chain 20 is not adequately secured, little or no transmission of force and/or energy is transmitted between first and second gears 720, 726 so that bead chain 20 will not raise or lower fabric 16.

Figure 12:
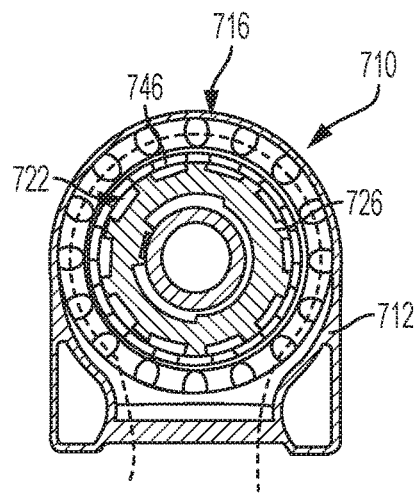
FIG. 12 is an end view of the chain wheel and spring driver showing the chain wheel pushed to the raised position by the chain wheel biaser so that gear teeth of the chain wheel are disengaged from gear teeth of the spring driver.
Figure 13A:
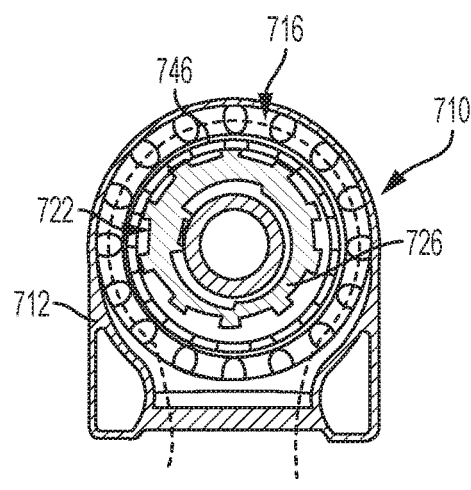
FIG. 13A is a view similar to FIG. 12 showing the chain wheel pushed to the lowered position by the chain wheel biaser so that the gear teeth of the chain wheel are engaged with the gear teeth of the spring driver to permit transmission of the rotation of the chain wheel to the spring driver.
Figure 13B:
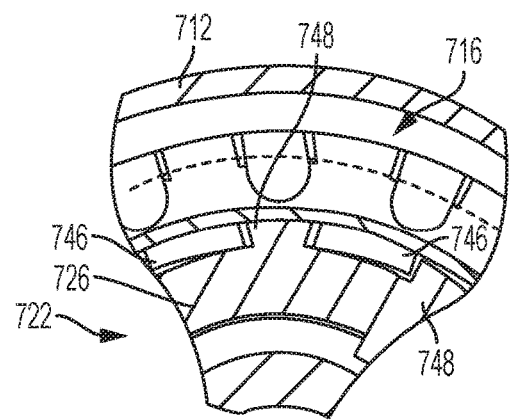
FIG. 13B is an enlarged view of a portion of FIG. 13A.
Figure 15A:
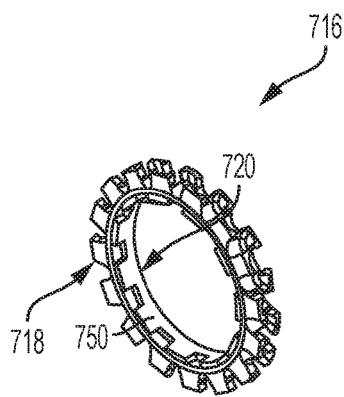
FIGS. 15A-15D are views of the chain wheel of the roller clutch of FIG. 8A.
Figure 15B:
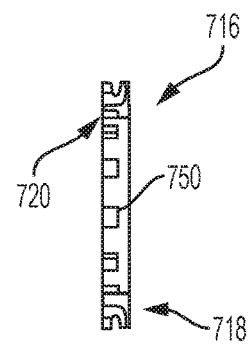
Figure 15C:
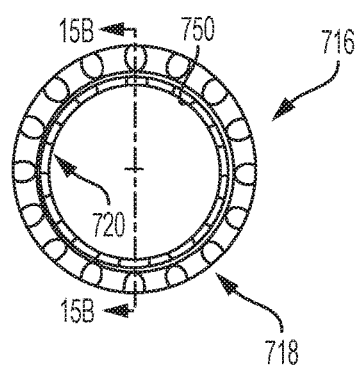
Figure 15D:
Figure 16A:
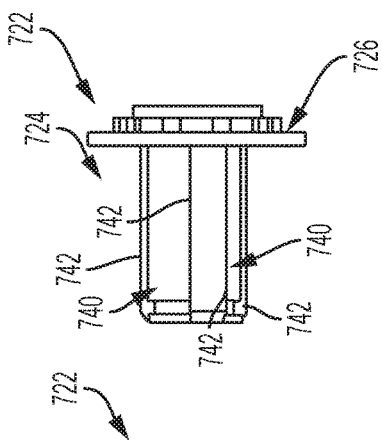
FIGS. 16A-16F are views of the spring driver of the roller clutch of FIG. 8A.
Figure 16B:
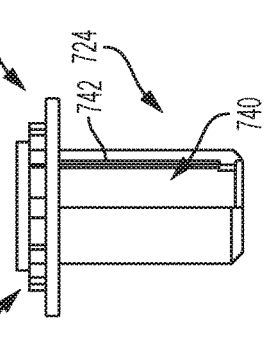
Figure 16C:
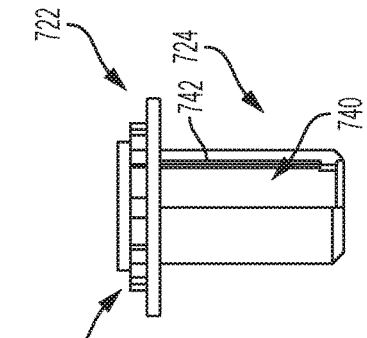
Figure 16D:
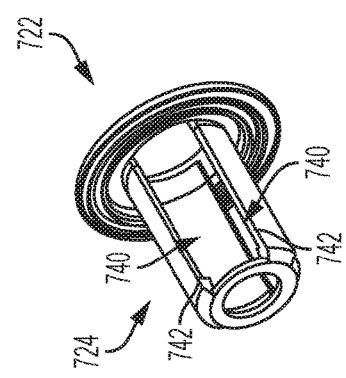
Figure 16E:
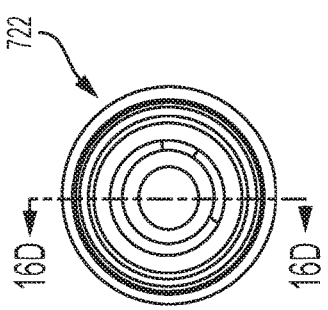
Figure 16F:
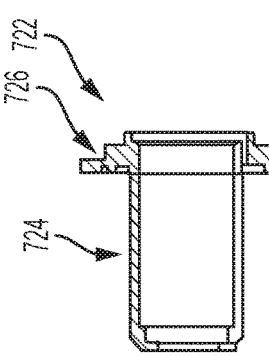
Figure 21D:
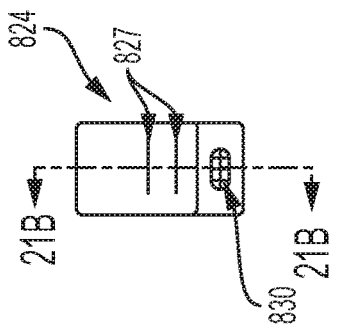
FIGS. 21A-21E are views of the base of the tensioner of FIG. 19.
Figure 21C:
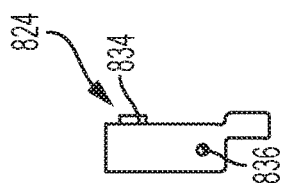
Figure 21E:
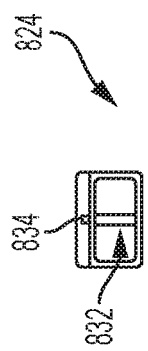
Figure 21B:
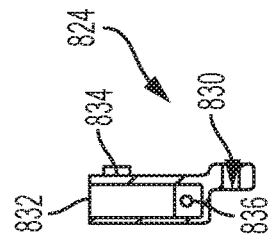
Figure 21A:
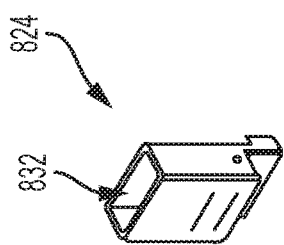
Figure 23A:
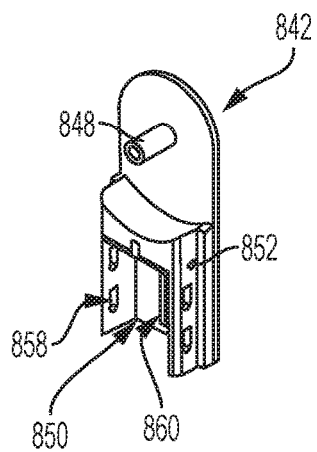
FIGS. 23A-23E are views of the pulley support of the tensioner of FIG. 19.
Figure 23B:
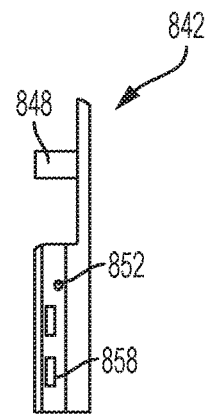
Figure 23C:
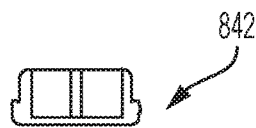
Figure 23D:
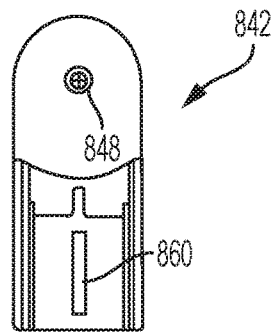
Figure 23E:
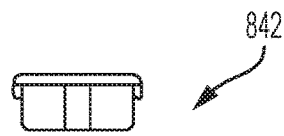

As shown in FIGS. 12, 13A, and 13B, first gear 720 includes a plurality of interactive members or internal gear teeth 746 and second gear 726 includes a plurality of interactive members or external teeth 748 that mesh with teeth 746 during a first state or normal operation when bead chain 20 is secured to window opening 24. As a result of this meshing, first gear 720 rotates second gear 726 as a user pulls on either side of bead chain 20. The resulting rotation of second gear 726 rotates spring driver 724, springs 714 that have been relaxed, drive adapter 728, and roller 14.

Figure 10:
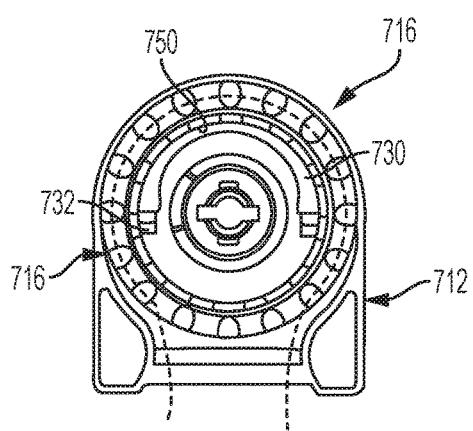
FIG. 10 is a view of the housing/base, chain wheel, and chain wheel biaser showing the chain wheel pushed to a raised position relative to the housing/base by the chain wheel biaser.
Figure 11:
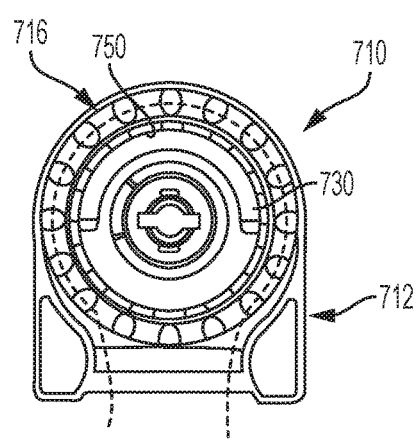
FIG. 11 is a view similar to FIG. 10 showing the bead chain pulling the chain wheel down against the bias of the chain wheel biaser to move the chain wheel to a lowered position.

As shown in FIGS. 10 and 11, gear separator 730 has a bearing surface that contacts an inner bearing surface 750 of ring 716. This contact biases ring 716 upward relative to housing 712. During assembly, lower ends 754 of gear separator 730 are inserted through openings 755 in housing 712 as shown in FIG. 8B. Upper ends of springs 732 are positioned within apertures or spring seats 752 on ends 754 of gear separator 730 and lower ends of springs 734 are positioned within apertures or spring seats 756 of ledges 758 of housing 712. When positioned between spring seats 752, 756, springs 732 are positioned outside of housing 712 and bead chain wheel 718 and bias gear separator 730 in an upward direction relative to housing 712 which biases ring 716 in the upward direction relative to housing 712.

When properly coupled to window opening 24, bead chain 20 biases ring 716 downward in a direction opposite of the bias of gear separator 730 as shown in FIG. 11. If lower end 28 of bead chain 20 is not properly coupled to window opening 24, gear separator 730 urges ring 716 with first gear 720 upward away from second gear 726 as shown in FIG. 10. This movement to a second state separates internal gear teeth 746 of first gear 720 from external gear teeth 748 of second gear 726, as shown in FIG. 12, so that rotation of ring 716 by bead chain 20 is not transmitted to roller 14. Thus, when bead chain 20 is not properly coupled to window opening 24, bead chain 20 will not rotate roller 14 to raise or lower fabric 16 to disable clutch 710. Similarly, if tensioner 22 is uncoupled, removed or the tension in bead chain 20 is otherwise removed, gear separator 730 will push first gear 720 upward and disable clutch 710.

Even though bead chain 20 cannot rotate roller 14, it can rotate bead chain ring 716. Thus, if bead chain 20 is not properly coupled to window opening 24, a user pulling on either side of bead chain 20 can cause chain ring 716 to rotate and bead chain 20 to rotate about bead chain ring 716. Thus, even though a user pulls down on either side of bead chain 20 to translate that side down while the other side translates up, roller 14 does not rotate.

Because gear separator 730 is always exerting upward force on chain ring 716, little or no rotational movement of bead chain 20 is required to move first gear 720 of chain ring 716 out of engagement with second gear 726 when lower end 28 of bead chain 20 is not properly secured. Thus, before installation no additional movement of bead chain 20 is required to disable bead chain 20 from being able to transmit force and/or energy to drive adapter 728.

During vertical movement of first gear 720 relative to second gear 726, the centers or axes of rotation of gears 720, 726 and bead chain wheel 718 also move relative to each other. For example, when bead chain 20 is not tensioned as shown in FIG. 12, the centers of gears 720, 726 are preferable co-extensive. When bead chain 20 is properly tensioned as shown in FIG. 13, the center of second gear 726 is vertically above the center of first gear 720.

Preferably during installation, a lower end of bead chain 20 is coupled to window opening 24 with a bead tensioner 22. During this movement, entire chain ring 716 moves down. Thus, both upper and lower halves of chain ring 716 move relative to housing 712 during the transition from preventing transmission of input to bead chain 20 to roller 14 to permitting transmission of input to bead chain 20 to roller 14.

As discussed above, during proper initial installation which includes coupling of bead chain 20 to window opening 24, first and second gears 720, 726 engage by meshing as shown in FIGS. 13A and 13B. During rotation of chain ring 716 by bead chain 20, teeth 748 of second gear 726 move into and out of engagement with teeth 746 of first gear 726 as gears 720, 726 rotate. As shown in FIG. 13A, during normal operation, only a portion of teeth 748 of inner, second gear 726 mesh with teeth 746 of outer, first gear 720. During rotation, the radial distance between adjacent teeth 746, 748 changes. For example, when teeth 746, 748 are positioned near the top of housing 712 during their rotation, these respective teeth 746, 748 radially overlap so they mesh. When teeth 746, 748 are positioned near the bottom of housing 712 during their rotation, these respective teeth are radially spaced apart so they do not mesh.

As shown in FIG. 13B, teeth 748 of second gear 726 are narrower than teeth 746 of first gear 720. Similarly, the distance and angle between adjacent teeth 748 of second gear 726 is greater than the distance and angle between adjacent teeth 746 of first gear 720. According to the preferred embodiment of the present disclosure, second gear 726 has fewer teeth 748 than first gear 720 has teeth 746. According to the preferred embodiment, second gear 726 has ten teeth 748 and first gear 720 has eleven teeth 746. As shown in FIG. 12, teeth 748 define an outer diameter that is less than an inner diameter defined by teeth 746.

As also shown in FIG. 13B, teeth 746, 748 of first and second gears 720, 726 are dovetail shaped have undercuts. Teeth 746 have radially outer bases that are narrower than the radially inner ends of teeth 746. Similarly, teeth 748 have radially inner bases that are narrower than the radially outer ends of teeth 748. As a result, portions of teeth 748 are "tucked under" portions of teeth 746 when these respective teeth 746, 748 mesh. Thus, portions of radially outer ends of teeth 748 of second gear 726 are radially positioned between portions of the radially inner ends of teeth 746 of first gear 720 and the remainder of first gear 720.

As mentioned above, after initial installation, it is possible that bead chain 20 may lose its proper coupling if tensioner 22 is uncoupled from window opening 24 or otherwise. In response, gear separator 730 will disengage first gear 720 of chain ring 716 from second gear 726 by lifting chain ring 716. According to the preferred embodiment, this disengagement does not require any rotation of chain ring 716 or any other component by bead chain 20. Furthermore, this disengagement is independent of the relative rotational position of chain ring 716 relative to housing 712, wrap springs 714, clutch spring driver 724, second gear 726, drive adapter 728, gear separator 730, springs 732, or roller 14.

Although preferred embodiment clutch 710 uses meshing engagement between first gear 720 of chain ring 716 and second gear 726 to transmit movement of the bed chain 20 to roller 14, other types of engagement may be provided. For example, internal gear teeth 746 of chain ring 716 may be replaced with frictional material, such as rubber or a gritty surface, and external gear teeth 748 of gear 726 may be replaced with a frictional material, such as rubber or a gritty surface. Movement of the frictional surfaces together under the downward force of properly coupled bead chain 20 causes enough frictional engagement between the frictional materials to transmit force and/or energy from bead chain 20 to roller 14.

According to the preferred embodiment, the movement between chain ring 716 and second gear 726 that provides for engagement and disengagement is vertical. According to other embodiments, the movement may be horizontal, as shown in FIGS. 4A and 4B and 7A and 7B, or in any other direction.

A preferred embodiment tensioner 822 is shown in FIGS. 19-22C, tensioner 822 includes a base 824, a shuttle assembly 826, and a spring 828 that biases shuttle assembly 826 relative to base 824. Base 824 includes a fastener-receiving aperture 830 for receiving a fastener (not shown) that couples tensioner 822 to a jamb, wall, or other surface of a window opening. Base 824 further includes a spring-receiving pocket 832, a lug 834, and a pair of aligned, pin-receiving apertures 836. During assembly, spring 828 is positioned in spring-receiving pocket 832 of base 824 and a pin 838 is inserted through a lower loop 840 of spring 828 and pin-receiving apertures 836 to secure spring 828 in base 824.

Shuttle assembly 826 includes a base 842, a cover 844, and pulley 846. Base 842 includes a pulley shaft 848, a base-receiving pocket 850, and a pair of pin receiving apertures 852. During assembly, pulley 846 is mounted on pulley shaft 848; a pin 838 is inserted through an upper loop 854 of spring 828 and pin-receiving apertures 852 to secure spring 828 to base 842; a portion of bead chain 20 is positioned under pulley 846; and cover 844 is coupled to base 842 of shuttle assembly 826 over base 824 by snapping ramps 856 of cover 844 in snap-apertures 858 of base 842. As a result of coupling cover 844 to base 842 of shuttle assembly 826, bead chain 20 is trapped within tensioner 822.

Shuttle assembly 826 telescopically receives base 824 and spring 828 biases the combination toward a retracted length. Base 842 of shuttle assembly includes a slot 860 that receives lug 834 of base 824. During the telescopic movement, lug 834 rides in slot 860 to guide shuttle assembly 826.

During installation, clutch 710 is mounted in a bracket, as discussed above, or otherwise supported in window opening 24. Next, base 824 of tensioner 822 is pulled downward to create tension in bead chain 20. During this tensioning, tensioner 822 telescopically extends and spring 828 stretches. Horizontal lines 827 on base 824 provide a tensioning range on for how much base 824 should be pulled down from shuttle assembly 826 to provide proper tension. Once tensioner 822 applies the appropriate amount of tension on bead chain 20, on or more fasteners (not shown) are extended through fastener-receiving aperture 830 and into window opening 24 to couple bead chain 20 to window opening 24.

During this tensioning, chain ring 716 is pulled down relative to housing 712 against the bias of gear separator 730. This movement engages first gear 720 with second gear 726 to allow bead chain 20 to rotation roller 14.

Another preferred embodiment roller clutch 810 is shown in FIGS. 24-26. Roller clutch 810 is similar to roller clutch 710. However, roller clutch 810 includes a cap 814 and fastener 816 that secures cap 814 to spring cylinder 834 of housing 812. Spring cylinder 834 includes a slot 820 that receives lugs 822 of cap 814 to block rotation therebetween.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A roller clutch for a window shade including
   a housing,
   a bead chain wheel supported by the housing and configured to receive a bead chain,
   a roller adapter sized to be received within a window shade roller, and
   interactive members having a first state transmitting bead chain movement from the bead chain wheel to the roller adapter to rotate the window shade roller and a second state blocking transmission of the bead chain movement from the bead chain wheel to the roller adapter while permitting rotation of the bead chain wheel.

2. The roller clutch of claim 1, wherein the interactive members include teeth supported on the bead chain wheel and teeth supported on the roller adapter.

3. The roller clutch of claim 2, wherein the teeth supported by the bead chain wheel define an inner diameter and the teeth supported by the roller adapter define an outer diameter greater smaller than the inner diameter.

4. The roller clutch of claim 1, wherein the interactive members move relative to each other from being engaged when in the first state to being disengaged when in the second state.

5. The engine of claim 1, wherein the bead chain wheel moves relative to the housing as the interactive members move between the first and second states.

6. The roller clutch of claim 5, wherein the bead chain wheel has an axis of rotation and the bead chain wheel moves radially during movement relative to the housing.

7. The roller clutch of claim 5, wherein the bead chain wheel has an axis of rotation and the bead chain wheel moves axially during movement relative to the housing.

8. A roller clutch for a window shade including
   a housing,
   a unitary bead chain wheel supported by the housing and configured to receive a bead chain,
   a roller adapter sized to be received within a window shade roller, and
   interactive members having a first state transmitting bead chain movement from the bead chain wheel to the roller adapter to rotate the window shade roller and a second state blocking transmission of the bead chain movement from the bead chain wheel to the roller adapter.

9. The roller clutch of claim 8, wherein bead chain includes an upper portion and a lower portion integral with the upper portion.

10. The roller clutch of claim 8, further including a spring operably positioned between the unitary bead chain wheel and the housing.

11. The roller clutch of claim 8, wherein unitary bead chain has an axis of rotation and the roller adapter has an axis of rotation that is offset from the axis of rotation of the unitary bead chain.

12. A roller clutch for a window shade including
    a housing,
    a bead chain wheel supported by the housing and configured to receive a bead chain,
    a roller adapter sized to be received within a window shade roller, and
    a spring positioned outside of the bead chain wheel to urge the roller clutch to a disengaged position blocking transmission of movement of the bead chain to the roller adapter, force from the bead chain moving the roller clutch to an engaged position transmitting movement of the bead chain to the roller adapter to rotate the window shade roller.

13. The roller clutch of claim 12, wherein the spring is operably positioned between the housing and the bead chain wheel.

14. The roller clutch of claim 12, further comprising interactive members operably positioned between the bead chain wheel and the roller adapter, wherein the spring urges the interactive members apart.

15. The roller clutch of claim 12, further comprising a bearing surface supporting the bead chain wheel for rotation thereon, wherein the spring urges the bearing support surface into contact with the bead chain wheel.

16. A roller clutch for a window shade including
    a housing,
    a bead chain wheel supported by the housing and configured to receive a bead chain, the bead chain wheel being moveable relative to the housing from a raised position to a lowered position, the bead chain wheel having an upper portion and a lower portion, the lower portion of the bead chain wheel moving relative to the housing during movement of the bead chain wheel between the raised and lowered positions, and
    a roller adapter sized to be received within a window shade roller, transmission of movement of the bead chain to the roller adapter being dependent upon movement of the bead chain wheel between the raised and lowered positions.

17. The roller clutch of claim 16, wherein the bead chain wheel has an axis of rotation and the lower portion moves radially relative to the housing during movement of the bead chain.

18. The roller clutch of claim 16, further comprising a spring positioned to urge the lower portion of the bead chain wheel toward a raised position.

19. The roller clutch of claim 16, wherein the upper and lower portions of the bead chain wheel including a plurality of teeth and the roller adapter includes upper and lower portions including a plurality of teeth, the teeth of the upper portion of the chain wheel being engaged with the teeth of the upper portion of the roller adapter and the teeth of the lower portion of the chain wheel being disengaged with the teeth of the lower portion of the roller adapter when the bead chain is in the lowered position.

20. The roller clutch of claim 16, wherein the bead chain wheel has an axis of rotation and the roller adapter has an axis of rotation that is offset from the axis of rotation of the bead chain wheel.

21. A roller clutch for a window shade including
    a housing,
    a bead chain wheel supported by the housing and configured to receive a bead chain, the bead chain wheel having an axis of rotation moveable relative to the housing from a first position to a second position, and a roller adapter sized to be received within a window shade roller, transmission of movement of the bead chain to the roller adapter being dependent upon movement of the axis of rotation of the bead chain wheel.

22. The roller clutch of claim 21, wherein the bead chain wheel has an axis of rotation and the movement between the first and second positions is radial.

23. The roller clutch of claim 21, wherein the bead chain wheel has an axis of rotation and the movement between the first and second positions is axial.

24. The roller clutch of claim 21, further comprising a spring positioned to urge the bead chain wheel toward the first position blocking transmission of the movement of the bead chain to the roller adapter.

25. The roller clutch of claim 21, further comprising interactive members, movement of the bead chain wheel between the first and second positions moving the interactive members between a disengaged position blocking transmission of the movement of the bead chain to the roller adapter and an engaged position transmitting movement of the bead chain to the roller adapter.

26. A roller clutch for a window shade including a housing, a bead chain wheel supported by the housing and configured to receive a bead chain, a roller adapter sized to be received within a window shade roller, and interactive members having a first state transmitting bead chain movement from the bead chain wheel to the roller adapter to rotate the window shade roller and a second state blocking transmission of the bead chain movement from the bead chain wheel to the roller adapter, the size of the bead chain wheel remaining consistent during movement of the interactive members between the first and second states.

27. The roller clutch of claim 26, wherein the bead chain wheel moves relative to the housing during movement of the interactive members between the first and second states.

28. The roller clutch of claim 26, wherein interactive members include teeth supported the bead chain wheel and teeth supported by the roller adapter.

29. The roller clutch of claim 26, wherein the interactive members are engaged when in the first state and disengaged when in the second state.

30. The roller clutch of claim 26, further comprising a spring urging the interactive members toward the second state.

31. The roller clutch of claim 26, wherein the bead chain wheel is free to rotate under force of the bead chain when in the first and second states.

* * * * *

UNITED STATES PATENT AND TRADEMARK OFFICE
CERTIFICATE OF CORRECTION

PATENT NO. : 9,790,737 B2
APPLICATION NO. : 14/001966
DATED : October 17, 2017
INVENTOR(S) : Harold R. Seib It is certified that error appears in the above-identified patent and that said Letters Patent is hereby corrected as shown below:

In the Specification

In Column 1, Line 35, at the end of the line, replace the word "an" with the word "a".

In Column 2, Line 37, replace the words "and a bed chain" with the words "and a bead chain".

In Column 2, Line 38, replace the words "the bed chain" with the words "the bead chain".

In Column 2, Line 45, replace the words "the bed chain" with the words "the bead chain".

In Column 2, Line 50, replace the words "the bed chain" with the words "the bead chain".

In Column 2, Line 51, replace the words "the bed chain" with the words "the bead chain".

In Column 2, Line 56, replace the words "bed chain" with the words "bead chain".

In Column 2, Line 60, replace the words "the bed chain" with the words "the bead chain".

In Column 3, Line 1, replace the words "from the inner gear" with the words "from the outer gear".

In Column 3, Line 7, replace the words "the bed chain" with the words "the bead chain".

In Column 3, Line 18, replace the words "the bed chain" with the words "the bead chain".

In Column 5, Line 32, replace the words "bed chain 20" with the words "bead chain 20".

In Column 5, Line 46, at the end of the line, replace the words "by bed" with the words "by bead".

In Column 5, Line 48, replace the words "bed chain 20" with the words "bead chain 20".

Signed and Sealed this
Eighth Day of May, 2018

Andrei Iancu
*Director of the United States Patent and Trademark Office*

CERTIFICATE OF CORRECTION (continued)
U.S. Pat. No. 9,790,737 B2

In Column 6, Line 30, replace the words "force/or" with the words "force and/or".

In Column 6, Line 30, replace the words "bed chain 20" with the words "bead chain 20".

In Column 6, Line 32, replace the words "bed chain 20" with the words "bead chain 20".

In Column 10, Line 6, replace the words "second 726" with the words "second gear 726".

In Column 12, Line 3, replace the words "the bed chain 20" with the words "the bead chain 20".

In Column 12, Line 60, replace the words "on or more fasteners" with the words "one or more fasteners".